July 1, 1941. G. BALACHOWSKY Re. 21,848

ELECTRIC CIRCUIT BREAKER

Original Filed Feb. 4, 1937 4 Sheets-Sheet 1

Inventor:
Georges Balachowsky,
by Harry E. Dunham
His Attorney.

ELECTRIC CIRCUIT BREAKER

Original Filed Feb. 4, 1937 4 Sheets-Sheet 2

Inventor:
Georges Balachowsky,
by Harry E. Dunham
His Attorney.

July 1, 1941. G. BALACHOWSKY Re. 21,848

ELECTRIC CIRCUIT BREAKER

Original Filed Feb. 4, 1937 4 Sheets-Sheet 3

Inventor:
Georges Balachowsky,
by Harry E. Dunham
His Attorney.

ELECTRIC CIRCUIT BREAKER

Original Filed Feb. 4, 1937 4 Sheets-Sheet 4

Inventor:
Georges Balachowsky,
by Harry E. Dunham
His Attorney.

Reissued July 1, 1941

Re. 21,848

UNITED STATES PATENT OFFICE 21,848

ELECTRIC CIRCUIT BREAKER

Georges Balachowsky, Paris, France, assignor to General Electric Company, a corporation of New York Original No. 2,158,846, dated May 16, 1939, Serial No. 124,131, February 4, 1937. Application for reissue May 9, 1941, Serial No. 392,742. In France February 27, 1936

10 Claims. (Cl. 200—150)

This invention relates to electric circuit breakers, more particularly to those of the fluid jet type wherein a blast of arc extinguishing fluid is projected across the arc, and has for its principal object the provision of an improved circuit breaker of the aforesaid type which shall be efficient and positive in its interrupting effect throughout the entire range of current rating.

In accordance with this invention, the circuit is preferably opened at two points in succession, and the arc at one point is subjected to a fluid blast caused by arc generated pressure, and at the other point is subjected to a fluid blast effected by and in accordance with the circuit opening operation. In a modified form the arc at a single point is subjected to the combined blast effect of arc generated and piston created pressures. With this arrangement the heavy current arcs are interrupted by the arc generated blast, and the high voltage low current arcs, if not interrupted by the aforesaid means, are interrupted by the blast created by the circuit opening movement.

My invention will be more fully set forth in the following description referring to the accompanying drawings, and the features of novelty which characterize my invention will be pointed out with particularity in the claims annexed to and forming a part of this specification.

Figure 1:
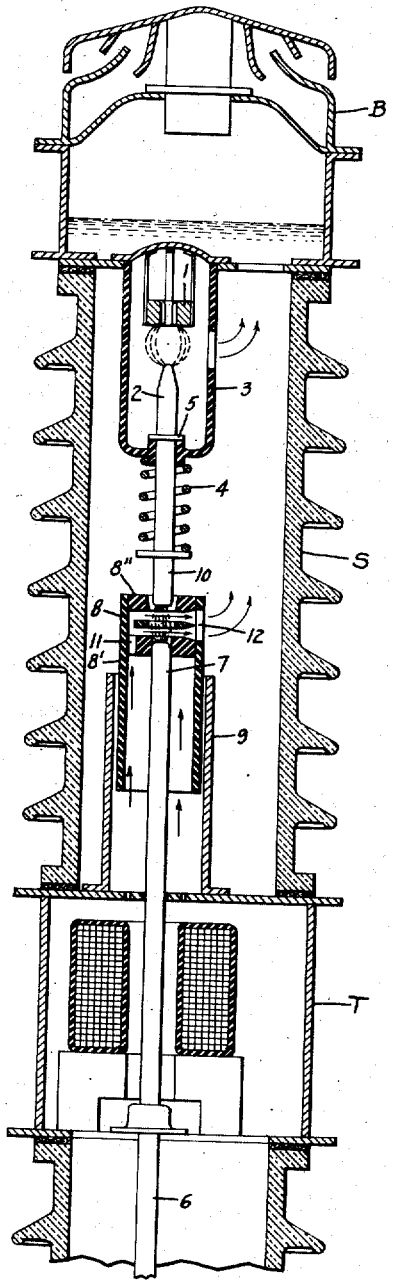
Figure 4:
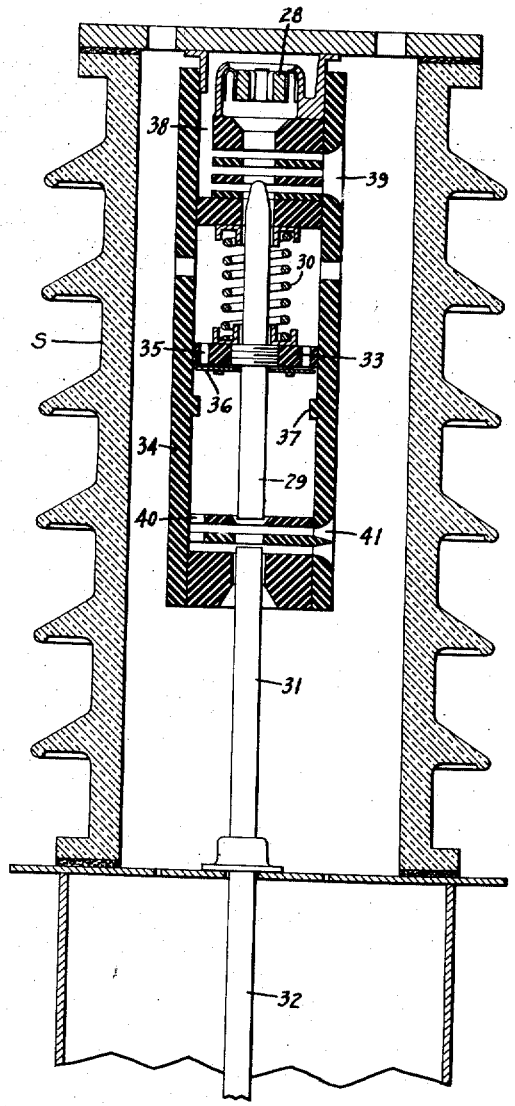
Figure 2:
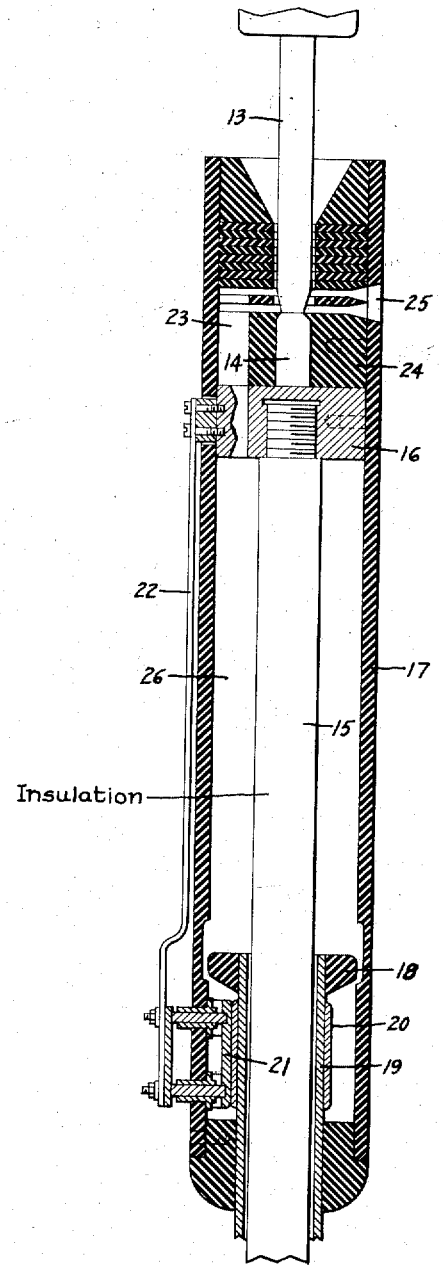
Figure 3:
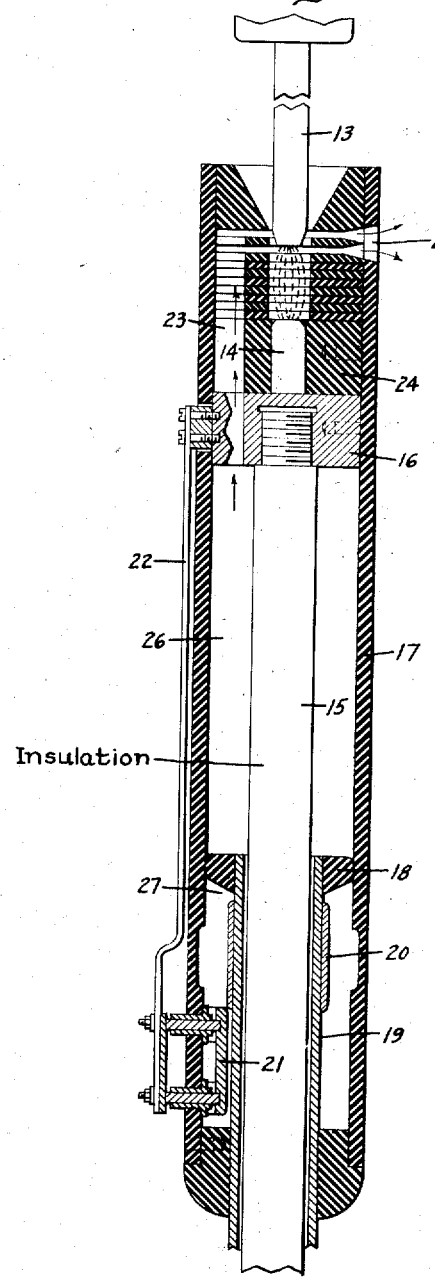
Figure 5:
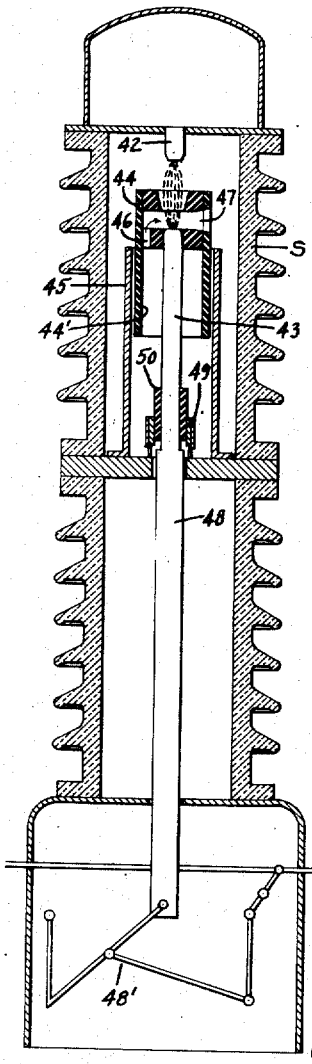
Figure 6:
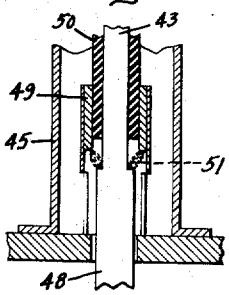
Figure 8:
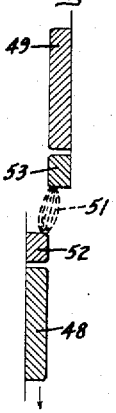
Figure 9:
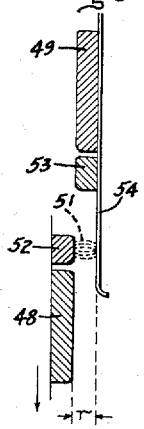
Figure 10:
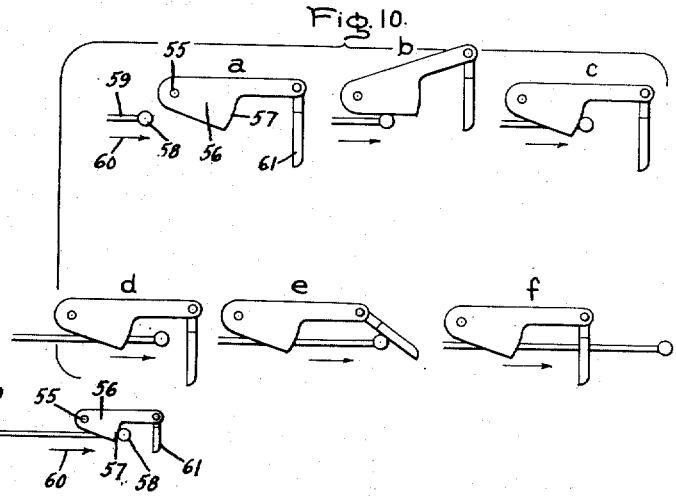
Figure 11:
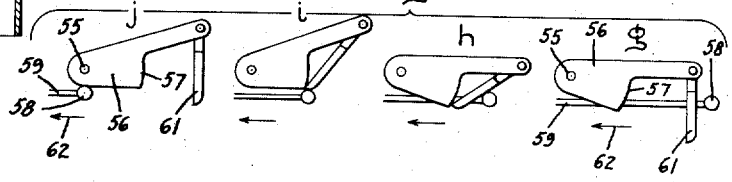
Figure 12:
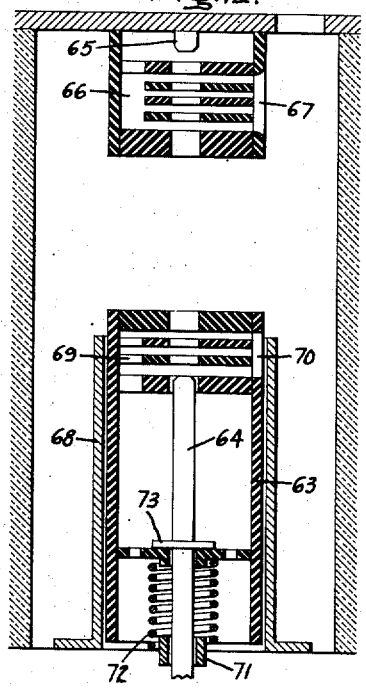
Figure 13:
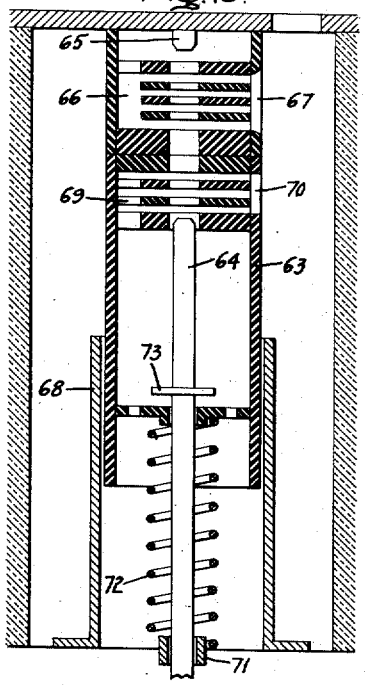
Figure 14:
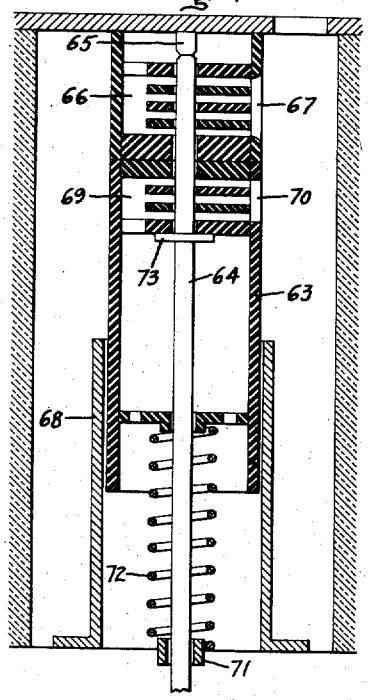
Figure 15:
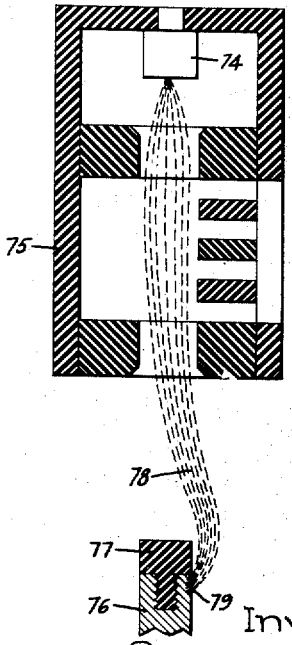

Referring to the drawings, Fig. 1 is an elevational view, partly in section, of a high voltage electric circuit breaker embodying the present invention, Figs. 2 and 3 are similar views of a modified form of circuit breaker in the closed and partly open circuit positions respectively, Fig. 4 is a view similar to Fig. 1 showing another modified form of the present invention, Figs. 5 to 9 inclusive, are views of another modified form of the present invention, Figs. 10 and 11 illustrate diagrammatically the operation of the anti-reclosing device shown by Fig. 5 during the opening and closing operations respectively, Figs. 12, 13 and 14 are elevational sectional views of another form of circuit breaker embodying the present invention in the open, partly open and closed circuit positions respectively, and Fig. 15 is a similar view illustrating another modification for low current interruptions.

In certain types of high voltage electric circuit breakers, such as the well-known explosion chamber type wherein an arc generated pressure causes expulsion of oil from the chamber through the arc, the interrupting performance may be very satisfactory at high currents due to the correspondingly high arc pressure, but unsatisfactory at low or weak currents. On the other hand, the type of circuit breaker which depends solely upon a piston created jet of oil, for example, may have difficulty in interrupting high currents due to the counter-pressure created by the arc tending to oppose the operation of the piston.

The present invention overcomes the above difficulties so as to operate satisfactorily throughout the entire range of current rating by applying jets of fluid dielectric, which may comprise any suitable liquid or gaseous arc extinguishing medium, at the point or points of circuit interruption in a definite sequence. With this arrangement, interruption of the circuit is insured by the second applied jet in the event that the first applied jet is not effective.

Referring more particularly to Fig. 1, there is, shown a high voltage vertical break oil circuit breaker comprising relatively movable contact structure adapted to form two breaks in series. The first break is formed between the fixed contact structure 1 and a movable intermediate contact 2, which are separable within an oil filled explosion chamber 3. The intermediate contact 2 is biased by a spring 4 away from the fixed contact 1, its travel being limited by a shoulder 5 forming a stop.

The main movable contact structure, which forms the second break comprises a reciprocally movable operating rod 6 carrying a contact rod 7. Secured to and movable with the contact rod 7 is an insulating piston structure 8 operable within a cylinder 9. The piston structure 8 comprises a cylindrical extension 8′, the lower end of which is open and in communication with the cylinder 9, the upper part being closed at 8″ except for a central opening for receiving the contact extension 10 of the intermediate contact. The piston structure 8 is also provided with insulating baffles forming an axial fluid passage 11 communicating with the cylinder 9 and transverse passages having exhaust nozzles at 12. The movable contact structure is operable through alined openings in the insulating piston 8 so that the passages 12 extend transversely thereof.

The breaker housing may comprise any suitable arrangement such as for example a ceramic insulating shell S mounted on a current transformer casing T at its lower end and carrying an oil baffle B at its upper end for preventing oil throw.

When the circuit breaker is closed the operating rod 6 is elevated so that the rod contact 7 engages the intermediate contact 2 at 10, forcing the contact 2 upward against the bias of spring 4 until the circuit is completed at the fixed contact 1.

In the opening operation the operating rod 6 is lowered so that the intermediate contact 2, which remains in following engagement with the contact 7 by reason of the spring 4 separates from the fixed contact 1 thereby forming an arc within the explosion chamber 3. The arc is often extinguished at this stage of the opening operation within the explosion chamber 3 in a manner well known in the art. If, however, the circuit is not interrupted the subsequent separation of the contacts 7 and 10 when the stop member 5 reaches its limiting position forms an arc within the baffle structure at 8 as illustrated in the drawings.

During the circuit opening operation, however, the piston structure 8 has been descending within the cylinder 9 so as to force oil from the cylinder by way of the passages 11 and 12. Accordingly, when the second arc is drawn transversely of the passages 12, it is immediately subjected to positive transverse oil jets. This second application of the oil jet is not dependent on the size of the current to be interrupted and insures complete opening of the circuit, particularly in the case where the current is too weak to develop sufficient blast pressure within the explosion chamber 3.

The circuit breaker shown by Figs. 2 and 3 comprises a fixed contact 13 and an intermediate movable contact 14 which is secured to and carried by the insulating operating rod 15. As illustrated by Fig. 2, the breaker is in the closed circuit position. Movable with the contact 14, which is electrically connected to a conducting block 16, is an insulating cylinder 17 coacting with a fixed piston member 18. The piston 18 is carried by a conducting tube 19 which is fixed and which also carries an annular fixed contact 20. In sliding conducting engagement with the contact 20 is the contact 21 which is carried by the cylinder 17 and which is electrically connected by a conductor 22 to the intermediate contact structure 14—16.

At the upper end of the cylinder 17 there are formed by the insulating structure 24, transverse jet passages communicating at one end through the axial passage 23 with the cylinder 17 and terminating at the exhaust nozzles 25.

In the closed circuit position shown by Fig. 2 the circuit is completed through the fixed contact 13, coacting movable contact structure 14—16, conductor 22, contacts 20 and 21 and the fixed conducting tube 19 which is suitably connected to the lower breaker terminal.

When the breaker is opened, the rod 15 is lowered so as to cause separation of the contacts 13 and 14. Coincident with the opening movement, the oil within the chamber 26 is subjected to pressure by the relative movement of the cylinder 17 and piston 18 resulting in on oil jet through the passages 23 and 25 transversely of the arc between contacts 13 and 14 as illustrated by Fig. 3.

As the opening operation progresses, lowering of the cylinder 17 finally causes separation of the contacts 20 and 21 within a chamber defined by the lower part of the cylinder 17 and the piston 18. In the event that the arc formed by the contacts 13 and 14 and has not been extinguished, which may occur in case a heavy current is to be interrupted, a second arc in series with the first arc is formed between contacts 20 and 21. There is then produced below the piston 18 within the chamber 27 a high arc generated pressure which causes immediate acceleration of the downward travel of the cylinder 17 so as to augment the force of the oil jet transversely of the arc at 25. This added force applied to the transverse oil jet insures complete opening of the circuit since the arc generated pressure is approximately proportional to the arc current.

The circuit breaker illustrated by Fig. 4 is generally similar in principle to the breaker shown by Fig. 1 and comprises a fixed contact 28 and a coacting intermediate contact 29 which is biased by a spring 30 away from the fixed contact. The intermediate contact 29 which also coacts with the movable contact rod 31 carries a piston member 33 which is operable within a fixed insulating cylinder 34. Apertures 35 in the piston are controlled by flap valves 36 for admitting oil to the lower part of the cylinder during the circuit closing operation. The travel of the intermediate contact 29 is limited by abutments at 37 on the cylinder 34.

When the breaker is to be operated from the open circuit position shown by Fig. 4, to the closed circuit position, the operating rod 32 is elevated so as to cause the rod contact 31 to engage the intermediate contact 29 and move the same against the bias of spring 30 into engagement with the fixed contact 28.

When the breaker is opened, the rod 32 is lowered and the intermediate contact, which follows for a limited distance the contact 31, separates from the fixed contact 28. Separation of the contacts 28 and 29 takes place within a known form of cross jet explosion chamber including an axial passage 38 in communication with the arc pressure at the contact 28 and with passages exhausting at 39 transversely of the arc.

Under certain conditions interruption of the circuit takes place within the transverse passages 39. The descent of the intermediate contact 29 under bias of the spring 30, however, is somewhat slower than the descent of the contact 31 due to the piston 33 with the result that a second break is formed between the contacts 29 and 31. If, at this time, the circuit is not interrupted at the first point, the second arc formed between the contacts 29 and 31 is subjected to a transverse jet by way of the passages 40 and 41 due to the descending piston 33. Accordingly, if the arc at the first break is not interrupted by the arc generated blast through the transverse passages 39, the circuit is very shortly thereafter interrupted by a piston driven jet directed through the second arc at the transverse passages 41.

Fig. 5 illustrates another form of circuit breaker generally similar in principle to that shown by Figs. 2 and 3. The breaker comprises a main fixed contact 42 and a coacting movable rod contact 43 to which is secured an insulating piston structure 44 operable within a cylinder 45. The piston 44, as in the case of Fig. 1, includes an extension 44' which is open at its lower end in direct communication with the cylinder 45. The upper end of the piston structure is closed except for a central aperture for receiving the contact 42 and a fluid passage formed by an aperture 46 communicating with the cylinder 45 and a transverse passage 47 extending transversely of the path of separation of the contacts 42 and 43.

It will be noted that the diameter of the contact portion of the rod contact 43 is smaller than that of the main operating extension 48. This difference in diameter enables the lower part of the rod contact, viz. at 48, to make separate engagement with a fixed annular contact 49. In the closed circuit position the contact portions 48 and 49 are in engagement as well as the contacts 42 and 43.

In the opening operation the rod 48 is lowered by a suitable linkage indicated at 48' and the piston structure 44 in descending into the cylinder 45 directs a transverse jet through the arc at 47 in the manner previously described. Also, it will be noted that after a predetermined separation of the contacts 42 and 43 the contacts 48 and 49 also separate thereby forming two breaks in series. If the arc at contacts 42 and 43 is not extinguished, a second arc will form between contacts 48 and 49 thereby increasing the pressure beneath the piston 44. An insulating sleeve 50 is secured to the fixed contact structure and guides the contact 43. This is best illustrated by the enlarged view in Fig. 6 wherein the arc formed between contacts 48 and 49 is indicated at 51.

The arc generated pressure in the cylinder 45 acts to increase the effectiveness of the oil jet. Accordingly, as in the previous cases a piston created oil jet initiated by and in accordance with the circuit-opening operation is effective to interrupt comparatively light or moderate currents, and a force corresponding to the magnitude of the current to be interrupted is further applied to the oil jet in the event that the arc is not interrupted by the first jet.

Figure 7:
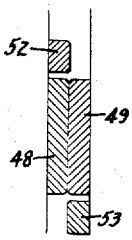

It may be advantageous to provide the sliding contacts 48 and 49 with arc shields so that the normal contact engaging surfaces are not subjected to the arc. Fig. 7 is an enlarged view illustrating such an arrangement, the arc shields 52 and 53 being annular in form and connected to the contacts 48 and 49 respectively. Fig. 7 illustrates the contacts in the closed circuit position, and Fig. 8 illustrates the operation of the arcing portions in the circuit opening operation.

Where it is advantageous to limit the length of arc 51 in order to prevent excessive arc pressure, as for example, to a distance approximately equal to the radial clearance $r$ between the contacts 43 and 49, the arc shield 53 is provided with an annular arcing horn 54 as shown by Fig. 9. The arcing shield 52 may be provided with a similar arcing portion if desired.

In view of the high pressure which is developed in the cylinder 45 by the arc at 51, it may be necessary to provide the operating mechanism of the circuit breaker at 48' with an interlocking device which will prevent the mechanism from reversing its movement, thereby tending to reclose the breaker during the opening operation. Any suitable device can be used to this end, Figs. 5, 10 and 11 illustrating a particularly simple and effective interlocking device.

The interlocking device consists of a cam which is rotatably mounted at a fixed pivot 55, the cam comprising a main portion 56 having a shoulder 57 which is adapted to engage a roller 58 carried by a rod 59 which is suitably connected to the operating mechanism 48'. Since the rod 59 is actuated during the opening operation in the direction indicated by the arrow at 60 (Fig. 5), the interlocking mechanism assumes successively the positions $a$ to $f$ of Fig. 10. These positions illustrate the elevational views as in Fig. 5.

It will, therefore, be seen that the follow-up roller 58 first lifts the cam 56 about its pivot 55 and then when it reaches position $c$ the cam drops behind the roller. In this position, which corresponds to separation of contacts 48 and 49, the roller is prevented from reversing its movement by the cam surface 57, and reverse or reclosing movement of the breaker is thereby precluded. As the opening movement continues the roller lifts the pivoted flap member 61 which is carried by the cam and moves past the flap finally assuming a position indicated at $f$.

In the closing operation, which is indicated by the directional arrow 62 of Fig. 11, the roller 58 assumes successively the positions $g$, $h$, $i$ and $j$. The flap 61 which is freely hinged on the cam (position $h$) enables the roller to lift the cam past the blocking surface 57 so that the roller can pass without obstruction beneath the cam.

Figs. 12, 13 and 14 illustrate another form of circuit breaker wherein the piston structure for creating the oil blast in accordance with the circuit opening operation is mounted for limited movement with respect to the movable contact structure. In this arrangement but one break is necessary for subjecting the arc to both an arc generated blast and a piston created blast.

Referring to Fig. 12 the single break is formed between the movable contact 64 associated with the insulating piston structure 63 and the fixed contact 65. The fixed contact is also associated with an insulating oil jet chamber having a passage 66 communicating with the arcing space and transverse passages terminating at 67. The chamber is also provided with a central passage in alinement with the contacts 64 and 65. The oil jet chamber above described functions in substantially the same manner as the corresponding structure of Fig. 4 to interrupt the arc between the contacts 64 and 65 by an arc generated cross blast.

The plunger type piston 63 which is mounted for limited sliding movement on the contact 64 operates within a fixed cylinder 68. As in the previous instance the piston has formed therein a passage 69 communicating with the cylinder and with transverse passages extending across the path of the movable contact and terminating at 70. The movable contact 64 is suitably connected to the corresponding breaker terminal through a fixed contact 71.

Fig. 12 illustrates the breaker in the open-circuit position, the movable contact rod 64 being held in its lower position against the bias of a spring 72. The spring 72 in this position holds the piston structure 63 against a stop member 73 of the movable contact so that the piston and contact move together during the latter part of the opening stroke and the first part of the closing stroke.

In the closing operation, which is illustrated by Fig. 13, the contact rod 64 is elevated carrying with it under bias of spring 72 the piston structure 63 until the piston engages the upper oil jet chamber. During the latter part of the closing stroke the contact 64 moves independently of the piston structure through the alined contact openings to engage the fixed contact 65 as illustrated by Fig. 14.

In the opening operation the contact 64 is lowered and during the initial travel thereof the arc between the contacts 64 and 65 is subjected to an arc generated blast through transverse passages 67. When the stop member 73 reaches the lower part of the piston from that point on the piston moves as a part of the movable contact structure so as to project an oil blast through the arc at the passages 70.

In the above-described arrangements the oil jets which are intended to insure under all conditions the interruption of the arc have been assumed to be produced by a piston type compressor. It will be understood, of course, that any other equivalent means may be utilized which is actuated by the operation of the movable contact structure of the breaker. When the interruption of comparatively weak currents only is involved, correspondingly low velocity oil blasts can be used. Such low velocity oil jets can be simply produced by the action of oil, which is comparatively stationary in the circuit breaker tank, on the rod of the movable contact when the crater or root of the arc is switched over to the side of the rod.

A simple arrangement of this character is shown by Fig. 15 wherein the fixed contact 74 is surrounded by a fixed oil jet chamber 75 having transverse oil jets similar to those of 66 and 67 of Fig. 12. Here the movable contact rod 76 carries a terminal extension 77 composed of arc-resisting insulating material. In the closed circuit position the extension 77 enters the contact 74 which is annular in form so that the circuit is closed at the sides of the contact rod 76. In operation the arc necessarily strikes between the contact 74 and a lateral side of the contact 76, the crate or root of the arc 78 being indicated at 79. The side wash of the oil on the crater of the arc at 79 is sufficient to interrupt the arc in the case of weak currents.

It shall be understood that the present invention is not limited to any predetermined sequence of operation of the arc generated blast and the piston created blast. That is, the particular operating requirements and interrupting characteristics can be determining as to whether the arc generated blast precedes the piston created blast.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. An electric circuit breaker of the fluid blast type comprising relatively movable contact structure, an arc-extinguishing fluid, and means for extinguishing arcing at said contact structure upon opening of the circuit including insulating structure movable in accordance with the circuit-opening operation, said insulating structure forming fluid passages adapted to traverse portions of the arc path, said insulating structure also including a piston for directing arc-extinguishing fluid through said passages for interrupting the circuit.

2. An electric circuit breaker of the fluid blast type comprising relatively movable contact structure, an arc-extinguishing fluid, and means for extinguishing arcing at said contact structure upon opening of the circuit including insulating structure forming fluid passages adapted to traverse portions of the arc path, said insulating structure also including a piston disposed within a casing containing said arc-extinguishing fluid, means for actuating said insulating structure in accordance with the circuit opening operation for forcing said fluid through said fluid passages, and means for also directing arc generated pressure for effecting the arc-extinguishing operation.

3. An electric circuit breaker of the fluid blast type comprising relative movable contact structure adapted to form two breaks in series, an arc-extinguishing fluid, insulating baffle structure through which the arc at one of said breaks is drawn and a piston connected to said movable contact structure for confining and subjecting respectively the arc at said one of said breaks to an arc-extinguishing blast of fluid in accordance with the circuit opening operation, and means for utilizing arc pressure generated at the other break for also extinguishing arcing.

4. An electric circuit breaker of the fluid blast type comprising relatively movable contact structure adapted to form two breaks in series, an arc extinguishing fluid, means forming an arc-interrupting chamber arranged for confining arc pressure so as to cause a blast of arc-extinguishing fluid from said chamber in response to formation of the arc, one of said breaks being formed within said chamber, and piston structure operable in accordance with the circuit opening operation for directing arc-extinguishing fluid through the arc at said other break.

5. An electric circuit breaker of the fluid blast type comprising relatively movable contact structure adapted to form two breaks in series, an arc-extinguishing fluid, and an arc chamber within which one of said breaks is initially formed, said chamber arranged to confine arc-generated pressure for causing a blast of arc-extinguishing fluid from said chamber through the arc, and an insulating baffle coacting with a piston movable in accordance with the circuit opening operation at the subsequently formed break for directing arc-extinguishing fluid through said break for interrupting the circuit in the event that it is not interrupted within said chamber.

6. An electric circuit interrupter of the fluid blast type comprising relatively movable contact structure, an arc-extinguishing fluid, and means for extinguishing arcing at said contact structure upon opening of the circuit comprising means for directing arc generated pressure so as to cause a blast of arc-extinguishing fluid through one portion of the arc, and insulating structure movable with said contact structure forming a fluid passage adapted to traverse another portion of the arc path, and a piston also connected to said movable contact structure adapted to force arc-extinguishing fluid through said passage.

7. An electric circuit interrupter of the fluid blast type comprising relatively movable contact structure adapted to form two breaks in series, an arc-extinguishing fluid, means forming an arc chamber within which one of said breaks is formed, said chamber arranged to direct arc generated pressure so as to cause an arc-extinguishing fluid blast, insulating piston structure forming fluid passages adapted to extend transversely of the arc path at the other of said breaks, said last-named break being formed subsequently to said other break, and means relating said piston structure to the movable contact structure so that arc-extinguishing fluid is forced through said passages in accordance with the circuit opening operation for interrupting arcing at said subsequently formed break.

8. An electric circuit breaker of the fluid blast type comprising relatively movable contact structure adapted to form two breaks in series, an arc-extinguishing fluid, insulating structure forming fluid passages adapted to traverse the path of the arc at one of said breaks, said insulating structure being operable as a piston in accordance with the circuit opening operation for forcing arc-extinguishing fluid through said passages, and means for directing arc pressure generated at the other of said breaks so as to augment the aforesaid arc-extinguishing blast.

9. An electric circuit breaker of the fluid blast type comprising relatively movable contact structure adapted to form two breaks in series, an arc-extinguishing fluid, piston structure forming a passage adapted to extend transversely of the arc path at one of said breaks, said piston structure movable in accordance with the circuit opening operation for driving arc-extinguishing fluid through said passage, means for directing arc pressure generated at said other break so as to increase the fluid pressure at said piston structure, and means operable upon the formation of said last-named break for blocking reverse movement of said contact and piston structure whereby said arc generated pressure is effective to augment the fluid blast at said first-named break.

10. An electric circuit breaker of the fluid blast type comprising relatively movable contact structure, an arc-extinguishing fluid, means for extinguishing arcing at said contact structure upon opening of the circuit comprising insulating structure forming fluid passages adapted to traverse portions of the arc path, said passages being arranged so that arc generated pressure causes an arc-extinguishing blast therefrom, a second insulating structure forming fluid passages adapted to traverse other portions of the arc path, said second insulating structure being relatively movable with respect to said first insulating structure, opening of the circuit initially causing arcing in said first insulating structure, and means for actuating said second insulating structure as a piston in accordance with the circuit opening operation so as to force arc-extinguishing fluid through the passages therein for interrupting arcing.

GEORGES BALACHOWSKY.